United States Patent [19]
Smith et al.

[11] Patent Number: 5,736,855
[45] Date of Patent: Apr. 7, 1998

[54] LOCAL BUFFER CIRCUIT FOR SONIC WAVEGUIDES

[76] Inventors: Stephen Williams Smith, 108 Pinecroft Dr., Raleigh, N.C. 27609; Arnold Fred Sprecher, Jr., 5712 Crutchfield Rd., Raleigh, N.C. 27606

[21] Appl. No.: 500,004

[22] Filed: Jul. 10, 1995

[51] Int. Cl.$^6$ .................. G01B 7/14; G01F 23/30; H04R 15/00
[52] U.S. Cl. .................. 324/207.13; 73/290 V; 324/207.24; 367/140
[58] Field of Search .................. 324/166, 207.13, 324/207.22, 207.24; 73/290 V, 313, 314, 319, DIG. 5; 333/148; 367/140, 908

[56] References Cited

U.S. PATENT DOCUMENTS

| | | | |
|---|---|---|---|
| 3,633,424 | 1/1972 | Lynnworth et al. | |
| 3,868,570 | 2/1975 | Kopera, Jr. | 324/166 |
| 3,898,555 | 8/1975 | Tellerman | 324/207.13 |
| 4,028,619 | 6/1977 | Edwards | 324/207.13 |
| 4,086,532 | 4/1978 | Aronson et al. | 324/166 |
| 4,384,250 | 5/1983 | Darrow | 324/166 X |
| 4,972,095 | 11/1990 | Oka et al. | 324/166 X |
| 5,017,867 | 5/1991 | Dumais et al. | 324/207.13 |
| 5,196,791 | 3/1993 | Dumais | 324/207.13 |
| 5,212,444 | 5/1993 | Abramovich et al. | 324/207.13 |
| 5,274,328 | 12/1993 | Begin et al. | 324/207.13 X |
| 5,313,160 | 5/1994 | Gloden et al. | 324/207.13 |
| 5,367,255 | 11/1994 | Nyce et al. | 324/207.13 |

*Primary Examiner*—Gerard R. Strecker
*Attorney, Agent, or Firm*—David M. Ostfeld

[57] ABSTRACT

A local buffer circuit for use with a magnetostrictive transducer is disclosed wherein the magnetostrictive transducer includes a pickup coil and the local buffer circuit includes two diodes in parallel with the pickup coil to clip or short the energy produced in the pickup coil generated by an interrogation pulse, and also includes a common emitter amplifier to reduce the electrical impedance of the pickup coil, also in parallel with the pickup coil.

30 Claims, 12 Drawing Sheets

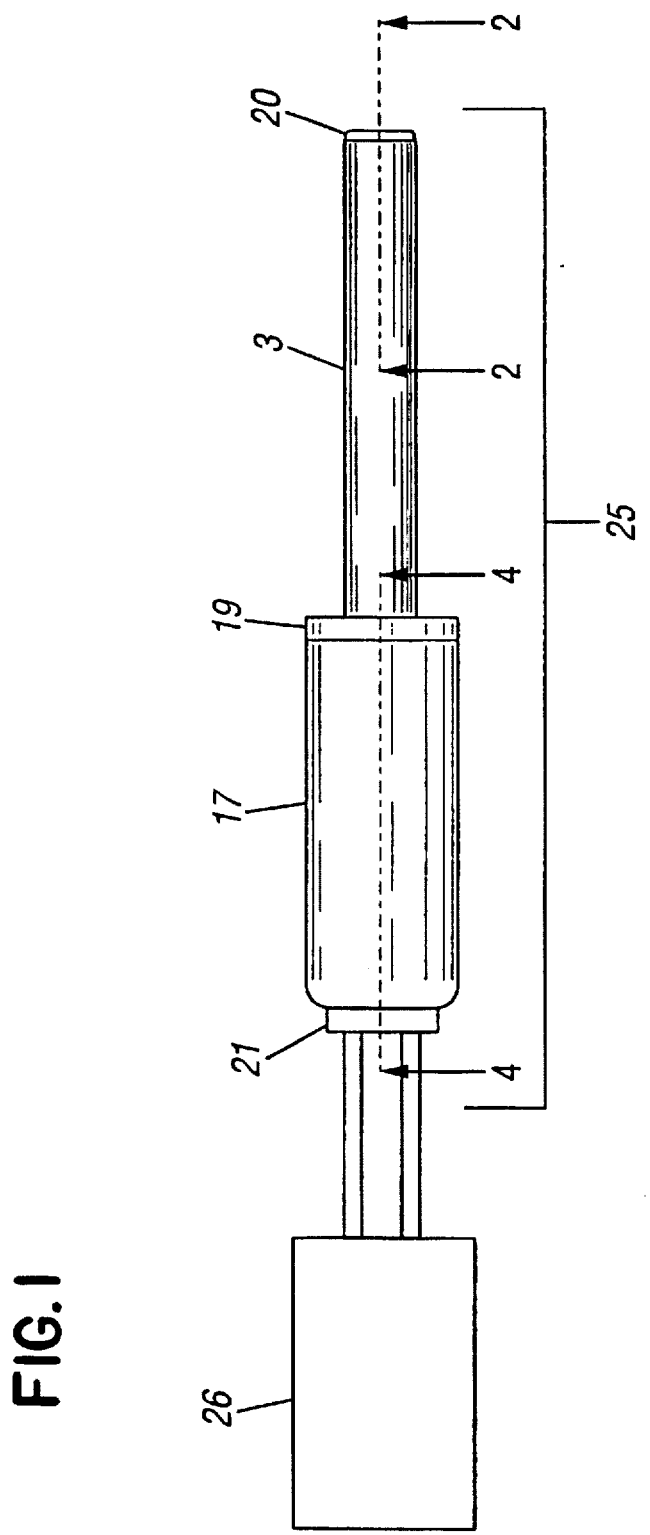

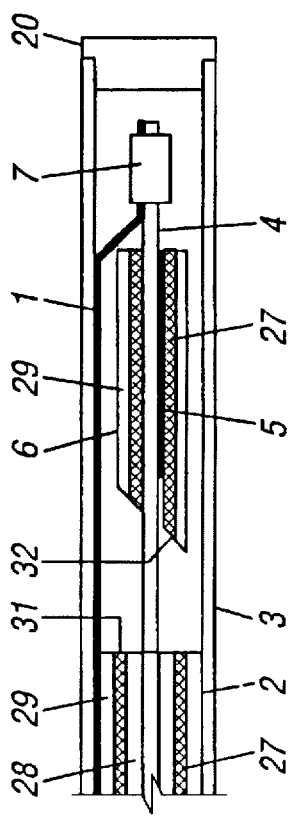
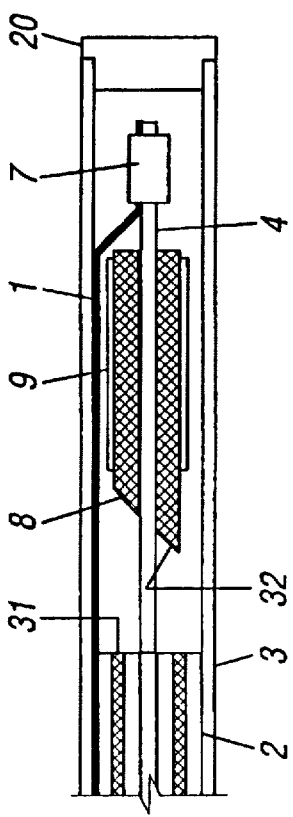
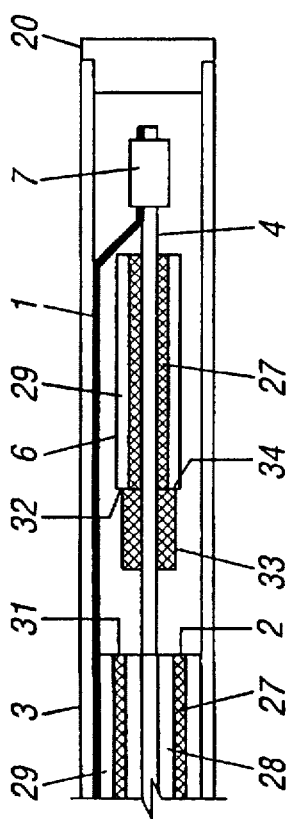
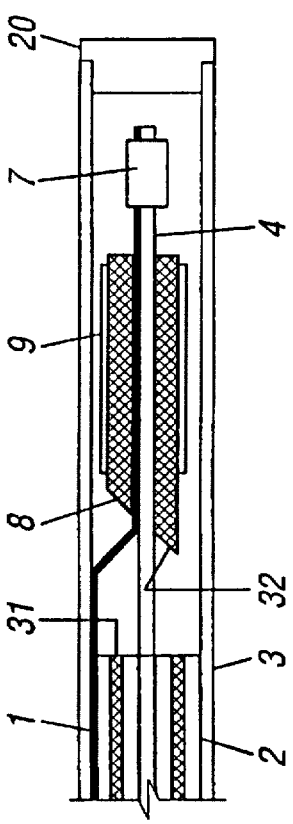

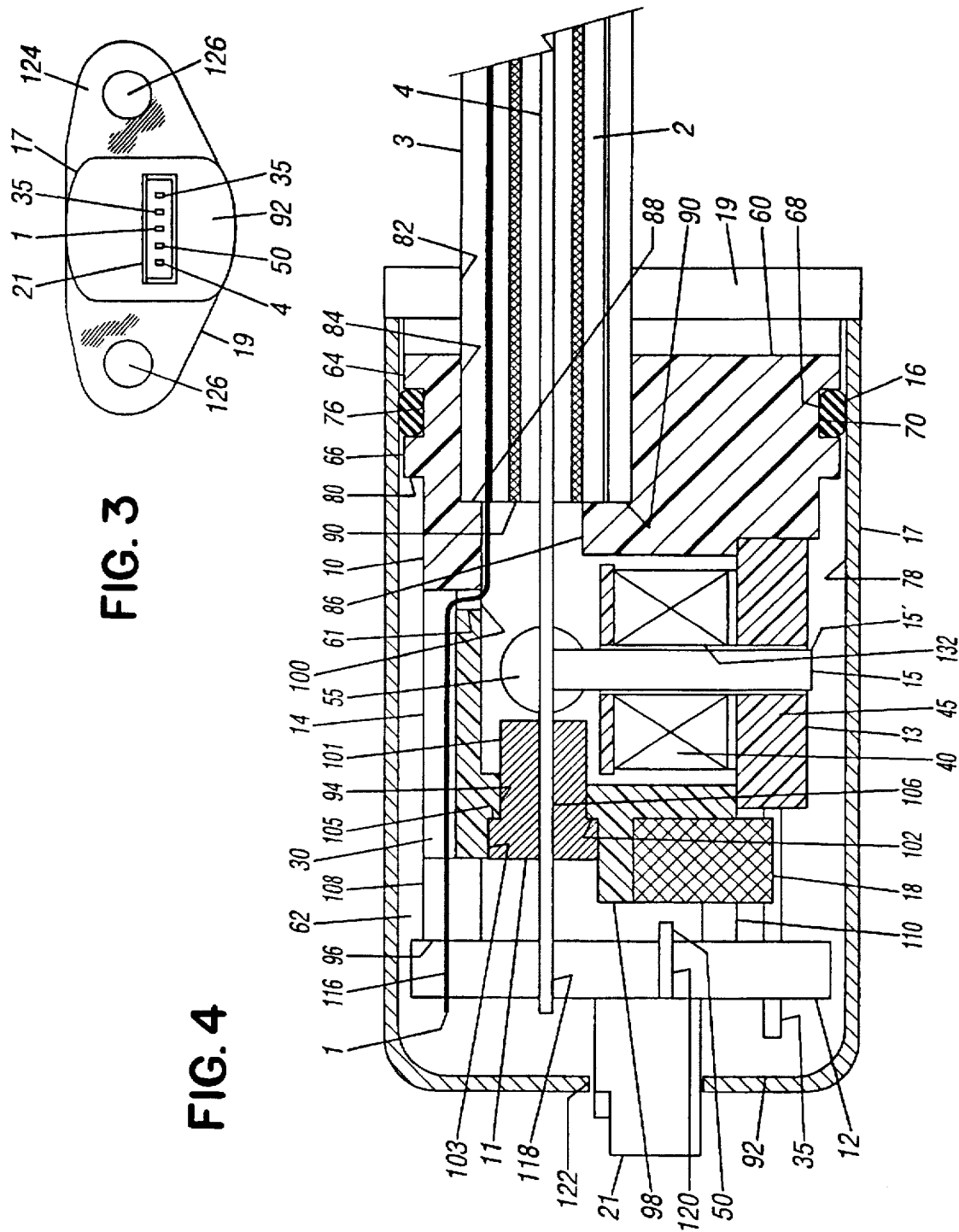

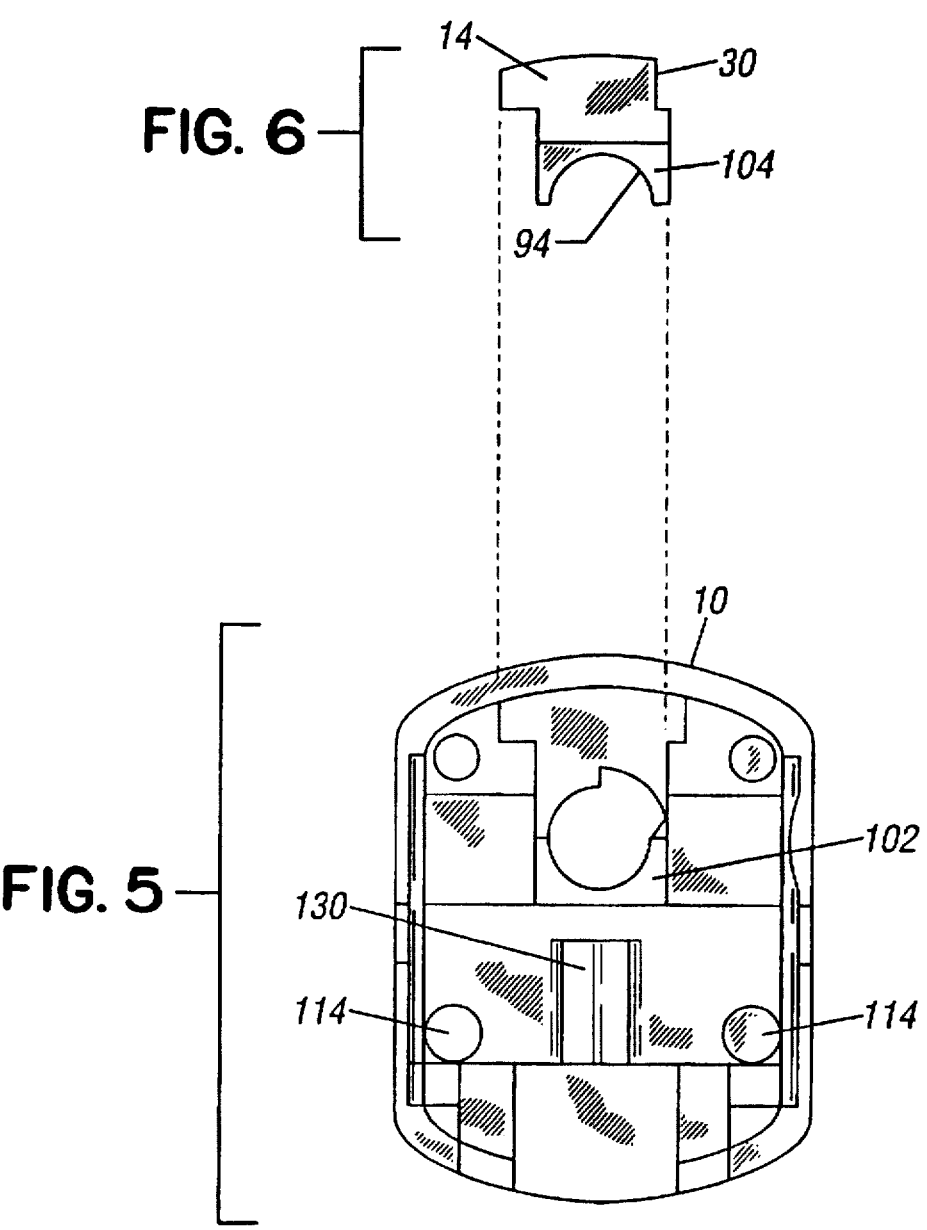

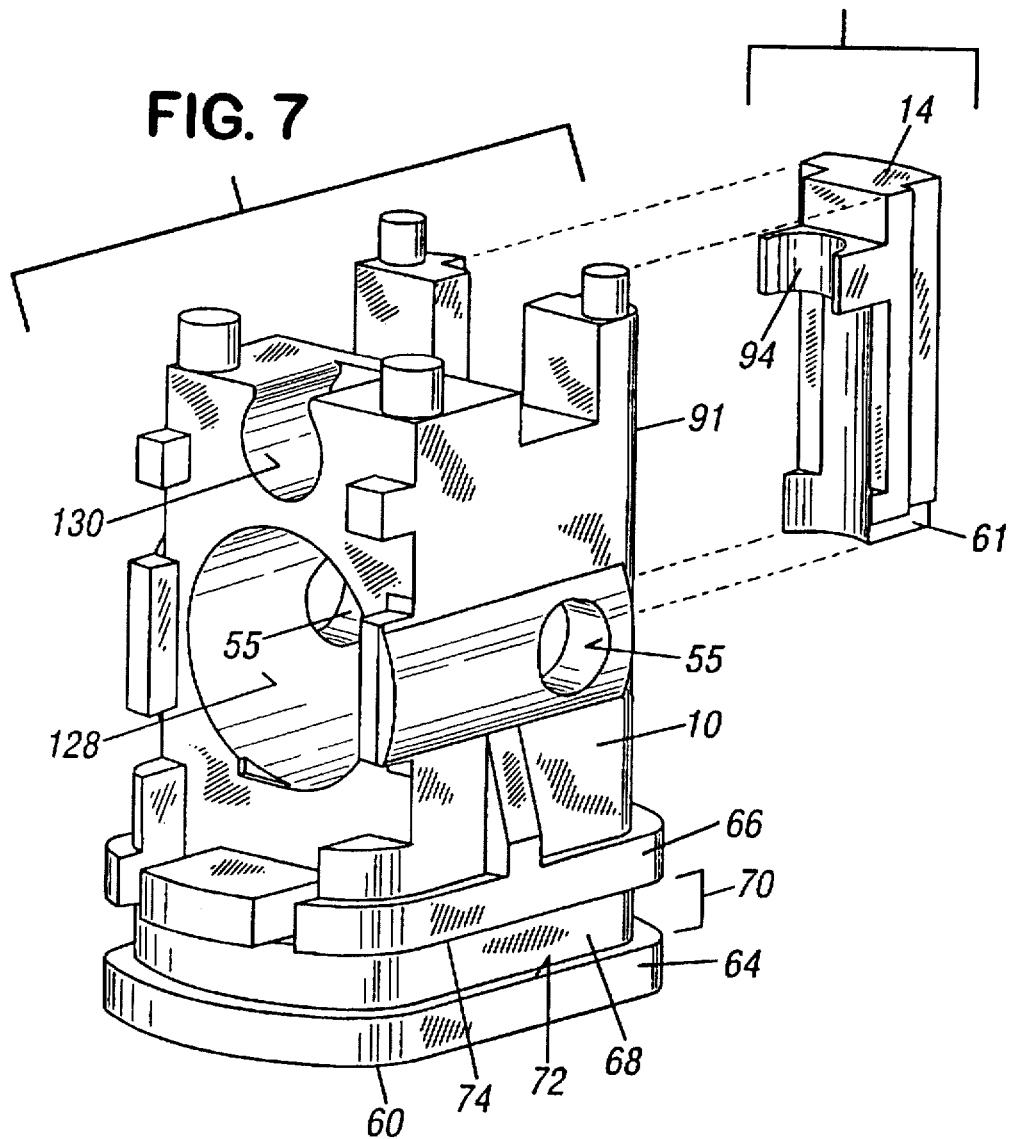

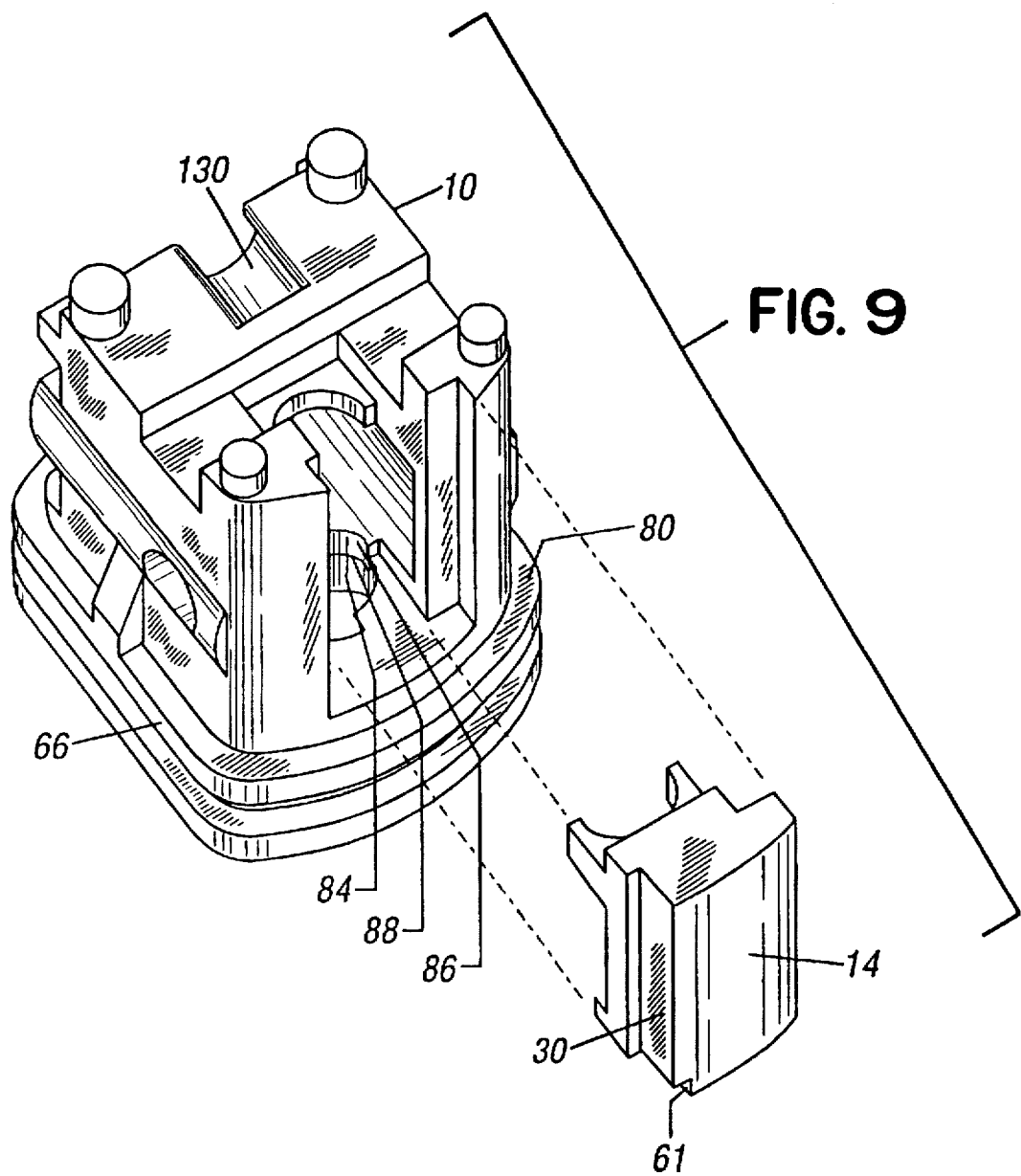

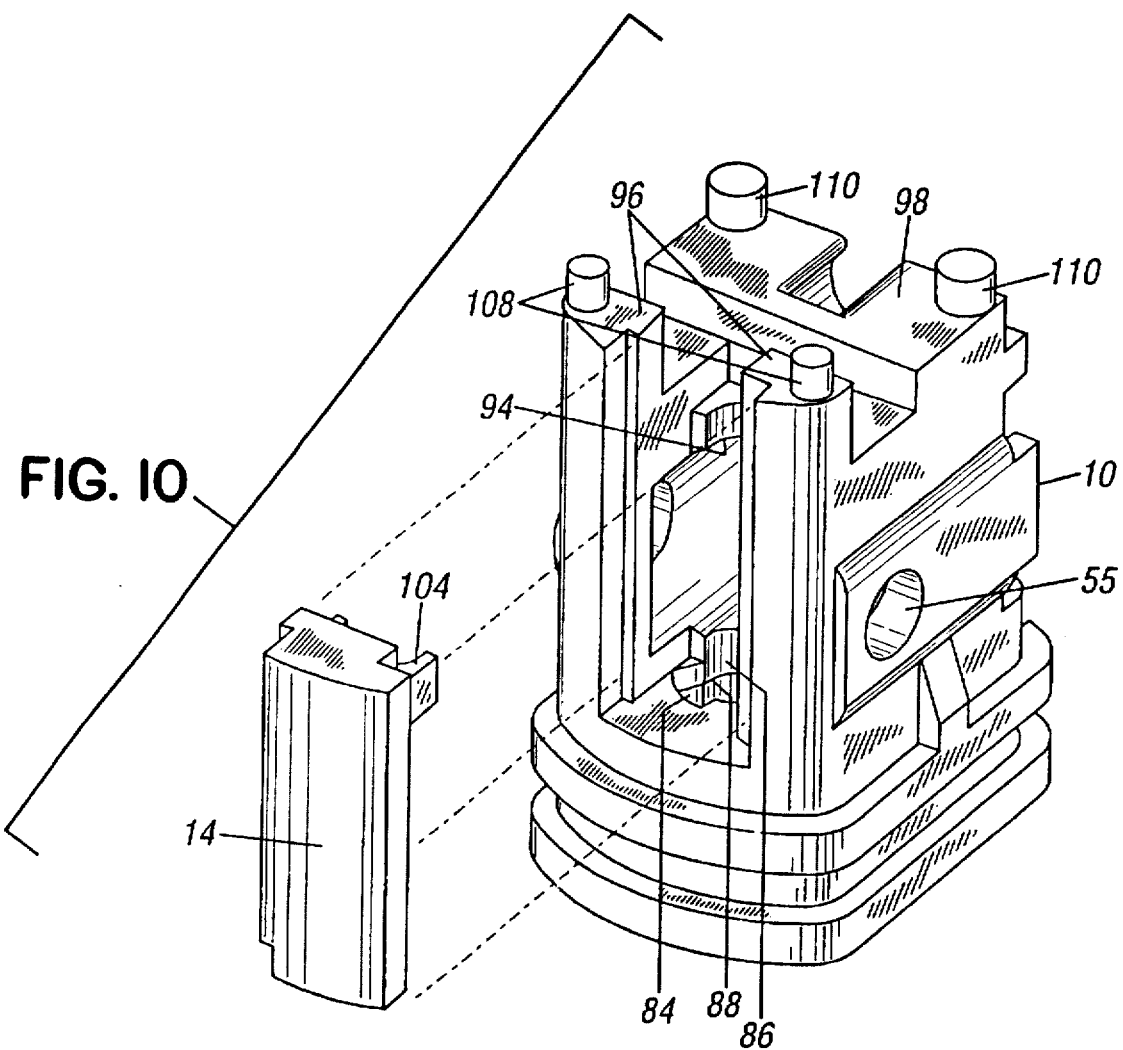

LOCAL BUFFER CIRCUIT FOR SONIC WAVEGUIDES

BACKGROUND OF THE INVENTION

1. Field of the Invention

The present invention relates to circuits for use with elongated wave guides in magnetostrictive displacement or distance measuring transducers, and more particularly to magnetostrictive transducers having a mode converter close coupled to the waveguide, such as for displacement or distance measuring using a local buffer circuit.

2. Description of the Art

Magnetostrictive traducers having elongated waveguides that carry torsional strain waves induced in the waveguide when current pulses are applied along the waveguide through a magnetic field are well known in the art. A typical linear distance measuring device using a movable magnet that interacts with the waveguide when current pulses are provided along the waveguide is shown in U.S. Pat. No. 3,898,555.

Devices of the prior art of the sort shown in U.S. Pat. No. 3,898,555 also have the sensor element embedded into the protective housing which also houses the electronics to at least generate the pulse and provide certain mounting means associated with the device for the customer.

U.S. Pat. No. 5,313,160 teaches a modular design in which the sensor and electronic assembly can be removed from the application package. In the application package is the outer housing which is used by the customer for mounting an attachment of the sensor and electronics assembly with the end device whose position is to be measured. However, none of the prior art teaches excluding all of the electronics except a local buffer circuit.

Sensor designs of the past have required delicate handling until the fabrication of the total unit, including outer housing and electronics, has been completed. Prior art also utilizes difficult to produce and expensive methods to suspend the waveguide and to prevent the reflection of the desired sonic strain wave. Prior high performance waveguide suspension systems utilize thin elastomer spacer discs which are individually positioned along the entire length of the waveguide. Installation of the discs is a time consuming, usually manual operation. The best performing damping devices in use utilize molded rubber elements with a central hole. These are difficult to mold and time consuming to apply.

Further damping devices for waveguide are illustrated in U.S. Pat. No. 3,898,555, to prevent reflected sonic strain waves at both the remote end of the waveguide and the mounted end of the waveguide. These devices generally are soft rubber pads that are damped about the waveguide to absorb sonic strain wave energy to minimize reflections of the generated pulse and reduce interference of the reflections with the sonic strain wave signals to be sensed. The damping devices and the arrangement for anchoring the waveguide at a remote end may take up a substantial length at the end remote from the pick-up element of a sonic waveguide for prior art of this sort, as discussed in U.S. Pat. No. 3,898,555. Where liquid levels, for example, are being sensed by the transducers, it is desirable to have the waveguide operable and active as close to the bottom of the tank as possible, thereby minimizing the length of the waveguide support at its remote end from the pick-up element, including the length of the separate damping device at such end, and at the mounted end of the waveguide, where the pick-up element is mounted.

In addition, in the prior art, the mass density of the damping material may be quite important to provide a mechanical impedance such that the sonic strain wave energy can be transferred into the damping device and dissipated. The coupling of the waveguide to the damping device must also be effective. The dissipation of the sonic strain wave energy by the damping medium has been thought in the prior art to provide the damping.

It is also known in the art to use gum type damping media because of the ability to attenuate or damp vibration but such materials harden at temperatures which are near the freezing point of water and become extremely soft at temperatures well below 200 degrees Fahrenheit. The same is true for epoxy or urethane elastomers, and such large changes in characteristics change the "front" end reflection and the "extreme" end reflection characteristics drastically with temperature.

It is also known in the art to use silicone rubber dampers of two different durometers and/or different loading pressure against the waveguide. Lower pressure and lower durometer silicone rubber has been utilized to minimize front end reflection (input end) while higher durometer silicone rubber in conjunction with greater clamping pressures has been utilized to provide damping at the remote or termination end. This use of silicone rubber was believed to be a compromise as a damping medium because of its high resilience, which leads to the need for long damping sections. Silicone rubber does have good stability over a wide temperature range which is an important benefit for damping materials.

The need for an effective damp material is especially evident when the transducer uses what is known as recirculation mode sensing. In the recirculation mode, each time the sensor receives a sonic strain wave signal, a new current pulse is sent, and this leads to a high frequency of sonic strain wave pulses and a build up of noise as a result of reflections. If effective damping is not provided, "noise" build-up reduces the usefulness of the sensing technique, especially since the sonic strain wave signal is known in the prior art to be of low amplitude. Thus, in the prior art, it was ideal for the damp material to be capable of being kept short, along with the end mounting structure for the waveguide, to have good coupling to the waveguide itself, and to have the ability to dissipate energy, the total of which is not well achieved in the prior art. For other approaches raising signal strength, see U.S. Pat. No. 4,952,873, to use the phase shifted reflection from the end of the waveguide to reinforce the primary signal.

An alternate methodology for damping is set out in U.S. Pat. No. 4,958,332. This patent teaches an improved damping method. The damping device comprises a highly viscous, flowable material that adheres to and couples to the waveguide, and which can have mass density changing additions, such as metallic powder, to vary the mass density along its length. The damping material is held against the waveguide with a suitable housing which can be loaded against the waveguide with pressure as selected. While such a method is effective, it is difficult to produce.

Also in the prior art, two half pieces (flat sheets) of rubber have been used to enclose a waveguide with a metal clamp to retain them around the waveguide and apply pressure to the waveguide, but this is fairly expensive.

The prior art has deficiencies in that the electronics are included within the waveguide suspension device, an expensive means for waveguide suspension is utilized and the prior art does not disclose the relationship between the waveguide suspension mechanism and the damping mechanism. The prior art also has deficiencies by not closely coupling the mode converter (any device that converts mechanical energy to electrical energy or electrical energy to mechanical energy) to the input pulse source while utilizing the reflected energy at the input end of the device from the end of the tape component of a mode converter.

It is also known in the prior art to use a coil for a mode converter having a high number of windings such as above 2400 windings and a coil for the mode converter that is a pickup coil with a low number of windings.

U.S. Pat. No. 4,952,873 also discloses a waveguide mounting block supporting a waveguide at the mounting end to provide a reflection point for the sonic waves. The block is precisely positioned a distance from the signal sensor that is travelled by the sonic wave during one-half of the signal lobe time period so that the reflected wave becomes an additive signal to the incoming sonic wave.

For general background information, see "Ultrasonic Level, Temperature and Density Sensor" by S. C. Rogers and G. N. Miller, IEEE Transactions on Nuclear Science, Vol. NS-29, No. 1, February 1982.

It is an object of the present invention to produce a local buffer circuit that permits closer coupling of a tape and coil mode converter arrangement for a magnetostrictive transducer.

It is a further object of the present invention to produce a local buffer circuit that is small and included within the sensor shielding while having the signal generator outside the sensor shielding.

SUMMARY OF THE INVENTION

The present invention relates to a local buffer circuit for use with remote end structures for an elongated member, such as a waveguide used with a magnetostrictive displacement or distance measuring transducer, that adequately prevents reflected waves such as torsional or longitudinal strain waves, at the remote end and does not take up a substantial length at the remote end, wherein the local buffer circuit dampens the effect of the signal at the input end and lessens the noise introduced to the mode converter if the mode converter includes a pickup coil with a high number of windings, such as 400 to 2500 turns. Thus, for example, the mode converter is located at the input end of the elongated member and operable and active close to the end of the elongated member, while the remote end structure prevents reflection of sonic strain waves that are transmitted along the waveguide. The local buffer circuit protects the mode converter from saturation by the received signal to help recovery of the pickup coil for the next signal by limiting the amount of energy delivered from the coil. Diodes in the local buffer circuit or a set of transistors are connected in parallel to the pickup coil and act to clip the peaks of the received signal and limit the energy induced in the pickup coil which results from the interrogation pulse. Thus, the position magnet (not shown here but described in U.S. Pat. No. 3,898,555) may more closely approach the head of the transducer.

Typically, the mode converter includes a pickup coil mounted coaxially about a tape. The local buffer circuit is incorporated directly after the pickup coil. The local buffer circuit includes an emitter amplifier in parallel with the pickup coil so that the impedance of the pickup coil can be lowered by several orders of magnitude in this manner. If the mode converter is shielded, such as by a housing, the buffer would be included inside of the shield or housing and the signal generator for the magnetostrictive device, i.e., the circuit that drives the waveguide, would be outside the shield. The use of a local buffer circuit reduces the sensitivity to electronic noise, maintains the signal integrity and enables the signal to be transmitted over long distance.

The electronics for pulse signal generation for transmission along the waveguide is not included in the electronics of the magnetostrictive transducer. The device electronics includes the fundamental signal and the local buffer circuit.

DESCRIPTION OF THE DRAWINGS

For a further understanding of the nature and objects of the present invention, reference should be had to the following figures in which like parts are given like reference numerals:

FIG. 1 depicts a side elevated view of the complete sensing element assembly;

FIG. 2a is a cross-sectional view of the sensing element assembly of the preferred embodiment of the present invention of FIG. 1 taken along section lines 2—2 of FIG. 1 showing a portion of the waveguide and surrounding sleeves showing the damping element at the end of the waveguide;

FIG. 2b is the same cross-sectional view of FIG. 2a, but showing a first alternative of using a tuning wire between the damping element and the waveguide;

FIG. 2c is the same cross-sectional view as FIG. 2a, but shows a second alternative of external tube crimped over the damping element;

FIG. 2d is the same cross-sectional view of FIG. 2a, but shows a third alternative of the return wire in a different position and with an external tube crimped over the damping element;

FIG. 3 depicts an elevated end view of the housing which shows the connector;

FIG. 4 is a cross-sectional view of the sensing element assembly of the preferred embodiment of the present invention of FIG. 1 taken along section lines 4—4 of FIG. 1 showing the cross-section of the housing and a portion of the waveguide and surrounding sleeves but not showing the damping mechanism;

FIG. 5 is a plan view of the bracket of the preferred embodiment of the present invention;

FIG. 6 is a plan view of the bracket cover of the preferred embodiment of the present invention;

FIG. 7 is a first profile view of the bracket of the preferred embodiment of the present invention;

FIG. 8 is a first profile view of the bracket cover of the preferred embodiment of the present invention;

FIG. 9 is a second profile view of the bracket of the preferred embodiment of the present invention showing it juxtaposed with the bracket cover of the preferred embodiment of the present invention;

FIG. 10 is a third profile view of the bracket of the preferred embodiment of the present invention showing the bracket cover juxtaposed;

DETAILED DESCRIPTION OF THE PREFERRED AND ALTERNATE EMBODIMENTS

Figure 11:
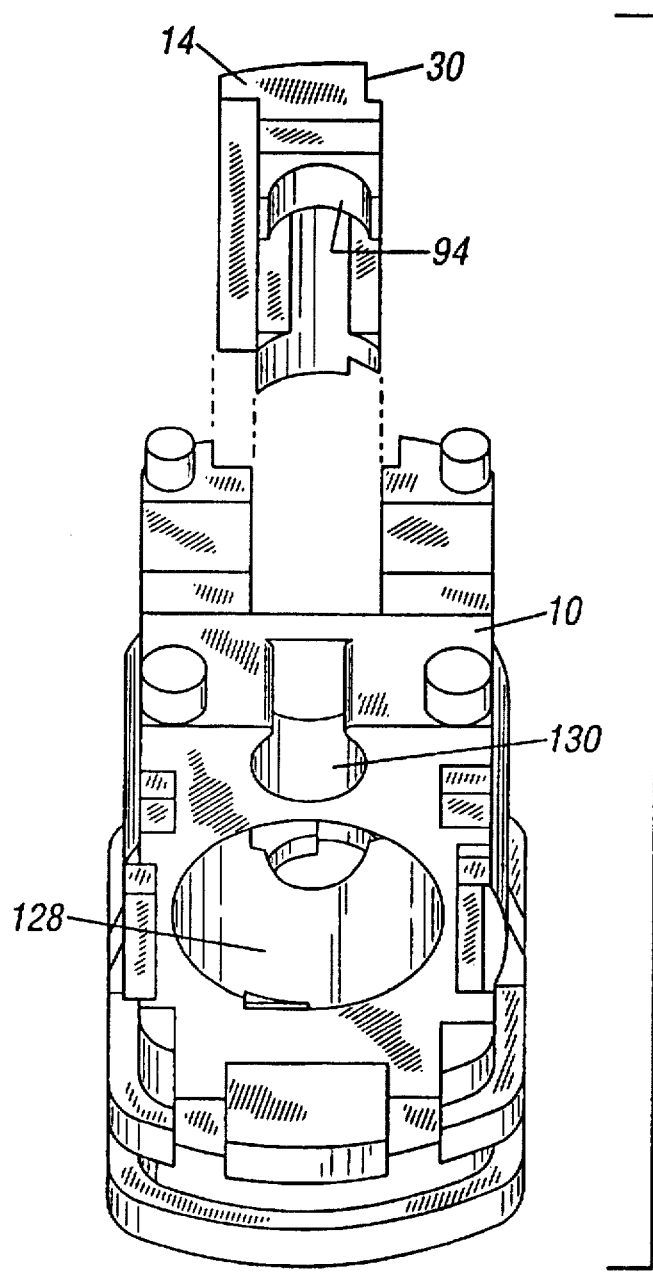
FIG. 11 is a view in profile of the end opposite to the end of FIGS. 9 and 10 of the bracket of the preferred embodiment of the present invention showing the bracket cover juxtaposed to it.
Figure 12:
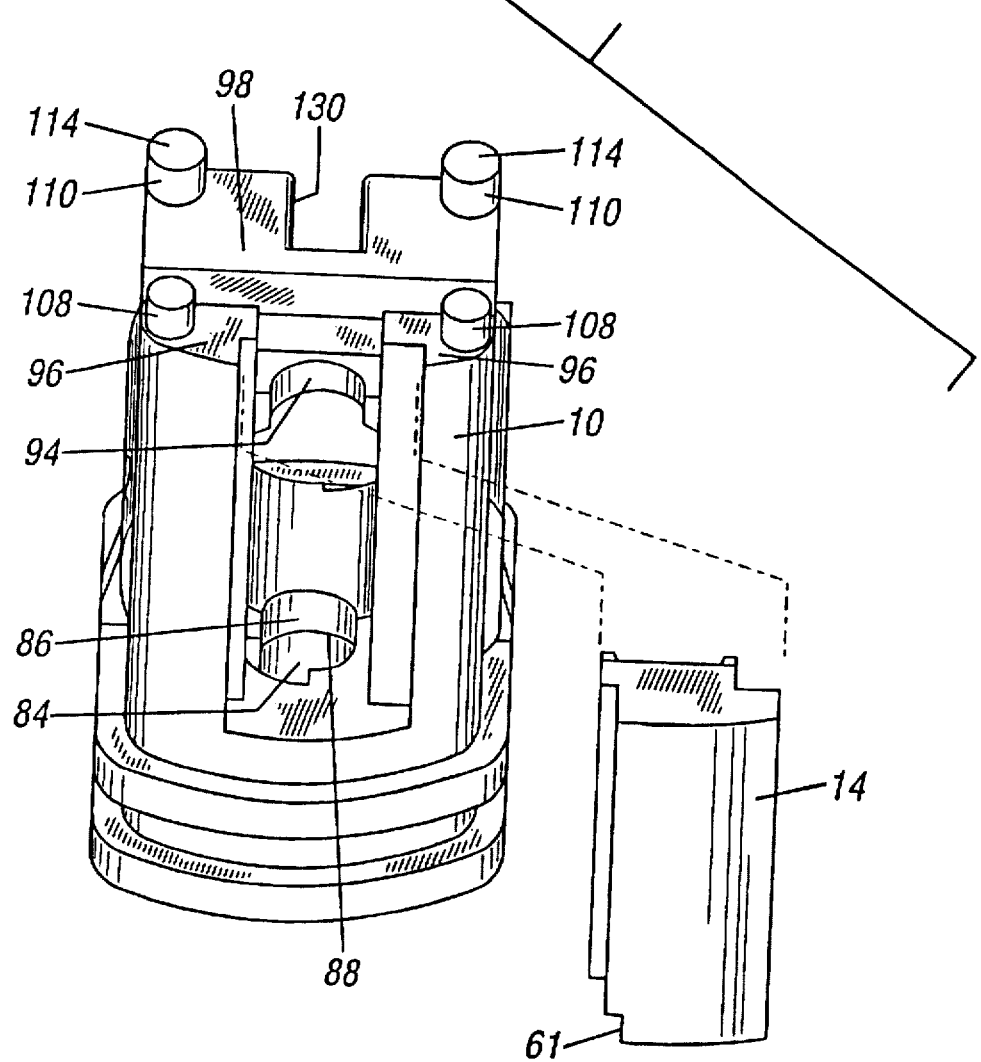
FIG. 12 is a different side view of the profile of the bracket of the preferred embodiment of the present invention.

A transducer or sensing element assembly, which may be any transducer, including those of the prior art such as that shown in U.S. Pat. No. 3,898,555 or any other transducer presently on the market or may be introduced in the future, for purposes of the damping element, is shown indicated at 25 in FIG. 1. Transducer 25 may be used for measuring displacements and/or distances or other measurements, and the damping device of the present invention will be applicable to any of them. The type of transducer that may be used for the present invention, should not be considered to be limited by the disclosure of the damping element used with the transducer. Further, except for mechanical construction indicating a preferred mechanical mounting of the waveguide, the general type of transducer should not be deemed to be limited by the disclosure of the waveguide suspension. The transducer should not be deemed to be limited to any particular type of electronics used with the waveguide except for the local buffer circuit. Additionally, the general type and nature of a transducer in electrically producing the return pulse and interfacing through the return pulse with any electronics of a buyer or user of the device should not be deemed to be limited by the disclosure except for the mechanical construction shown for the preferred embodiment and the printed circuit board containing the local buffer circuit.

The transducer 25 includes an elongated waveguide assembly enclosed in an enclosure tube 3. Enclosure tube 3 and the waveguide assembly are mechanically supported at one end by a housing 17 through an end flange 19. The waveguide assembly includes the outer enclosure tube 3 surrounding a coaxial elongated interior waveguide 4 (FIG. 2). Whenever "FIG. 2" is referenced in this specification, it means any of the embodiments of FIGS. 2a–2d. A current is passed through the waveguide 4 and returns through a return wire 1 electrically connected to the waveguide 4. Typically, a magnet (not shown) is mounted over the waveguide assembly and enclosure tube 3 by being placed over and coaxial with enclosure tube 3. The magnet interacts with the current pulse as more completely described in U.S. Pat. No. 3,898,555. Upon the strain wave pulse returning to the housing 17 after passing through the waveguide 4 and return wire 1, the placement of waveguide 4 and return wire 1 being more completely described below, a suitable mode converter (partially shown) of any type known or to be known in the art provides an electrical signal through connector 21 to any electronic circuit connected to it, such as electronic circuit 26.

Figure 14:
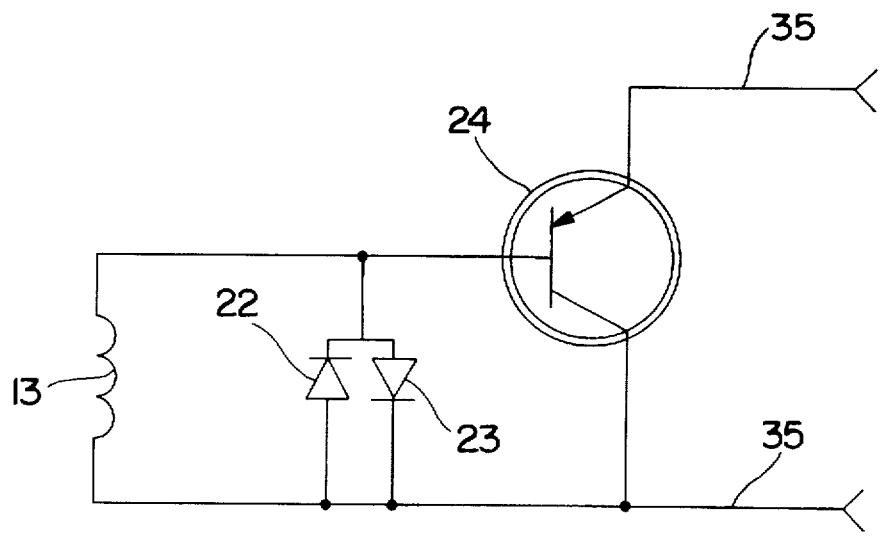
FIG. 14 is the preferred embodiment of the local buffer circuit of the present invention.
Figure 15:
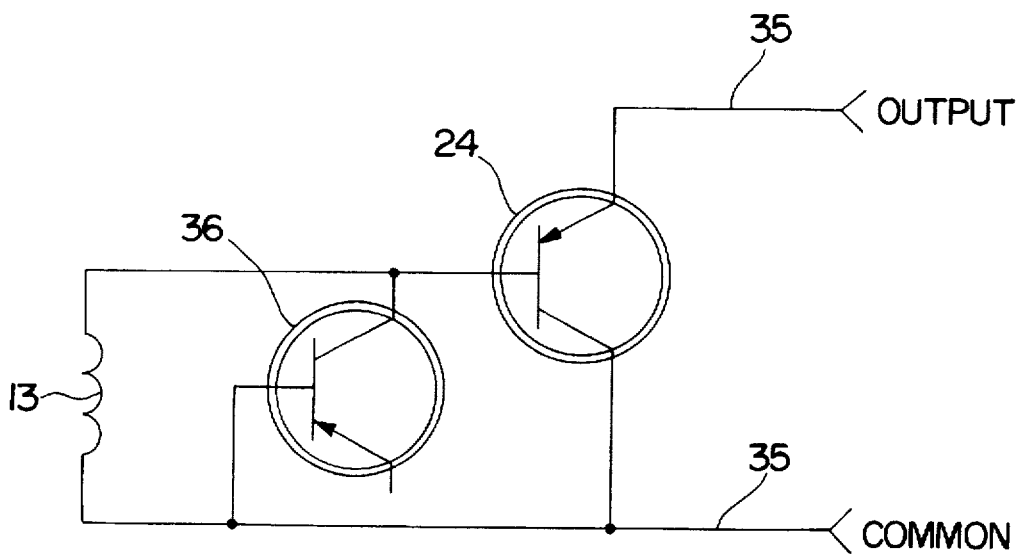
FIG. 15 is an alternate embodiment of the local buffer circuit of the present invention.

The structure of the circuit 26 is dependent on the use of transducer 25, and will work with the waveguide suspension sleeve 2 and modular construction elements of the present invention despite disparities in structure. The structure of circuit 26 should not be considered as limiting the invention. Thus, no particular mechanism for the arrangement of the element 26 or any conditioning of the signal to circuit 26 is shown to be preferred to emphasize generality except the local buffer circuit as shown in FIG. 14 or FIG. 15. Further, it should be understood that the waveguide suspension sleeve 2 mechanism of the present invention is applicable to any transducer 25 and waveguide 4 of the type for measuring displacement and/or distance and/or other measurement using the magnetostrictive principles, such as generally shown in U.S. Pat. No. 3,898,555, but is dependent for modular assembly to some extent on the mechanical arrangement of elements in housing 17. Thus, for example, a particular mechanism for the arrangement of the elements in the housing 17 is shown to be preferred for mounting, but otherwise should not limit generality. The mechanism other than mounting may be of any sort, including such as those shown in U.S. Pat. No. 3,898,555 or others known in the art or still to be thought of in the art or that are in design in the art. For this same reason, the type of magnet used and the type of application used is also not shown, and may be any application. Finally, because there is some need to show the interaction between the damping element 6 (FIG. 2) and the waveguide suspension sleeve 2 and other portions of transducer 25 at the remote portion of the waveguide assembly, a preferred embodiment for an enclosure tube 3 (FIG. 2), discussed below, with the waveguide suspension sleeve 2 and damping element 6 is shown. This should not be considered as limiting but only illustrative, the waveguide suspension sleeve 2 being capable of use with any type of waveguide assembly as set out above.

The remote end portion of enclosure tube 3, remote from housing 17, is shown in cross-section in FIG. 2 and ends with an end plug 20. An inert gas may be introduced in enclosure tube 3 to further promote isolation and sealing. End plug 20 acts to stop fluid and other materials from entering enclosure tube 3. The end of the waveguide assembly having end plug 20, is normally the end which would be at the bottom of a tank, if transducer 25 is being used for determining the level of liquid in a tank, or at the end of the displacement if the transducer 25 were used to measure distance. As discussed in the Background, it is desired to make the dead zone, or non-signal producing zone, adjacent to the end plug 20 as short as possible and yet accomplish the purpose of dampening the sonic strain wave signal to prevent reflected strain waves from interfering with the desired return strain wave signal that represents distance or level, such as discussed in U.S. Pat. No. 3,898,555.

As shown in FIG. 2, a waveguide 4 is enclosed through concentrically layered enclosure mechanisms, including a suspension sleeve 2 and enclosure tube 3. The suspension sleeve 2 comprises a tubular braided sleeve, or elastomer sleeve, or composite sleeve, of a geometry having the characteristics of restricting the lateral movement of the waveguide 4 and insulating the waveguide 4 from vibration and external sonic noise yet not contacting the waveguide 4 so much as to damp the sonic strain wave signal generated by the interaction of the electric current and external magnet. Suspension sleeve 2 is coaxial with and surrounds the waveguide 4 for substantially its entire length, or at least a major portion thereof. Suspension sleeve 2 is shown mounted within and coaxial for substantially the entire length of waveguide 4, or at least a major portion thereof, with outer enclosure tube 3.

The inner diameter of the suspension sleeve 2 must be small enough to limit the movement of the waveguide 4 yet large enough so that it does not hold, grab, constrict or otherwise compress the waveguide 4. If suspension sleeve 2 compresses, holds, grabs or constricts the waveguide 4, attenuation of the sonic strain wave signal along waveguide 4 will occur. The Wiedemann Effect does not promote a large sonic strain wave signal in the prior art, making it difficult to differentiate it from noise produced by other mechanisms. Accordingly, signal attenuation is known in the prior art to be a phenomenon to be avoided.

The outer diameter of suspension sleeve 2 must be large enough to restrict lateral movement of suspension sleeve 2 within enclosure tube 3, yet small enough to fit easily within the inner diameter of the enclosure tube 3, together with the return wire 1 as will be discussed below. Also, it may be possible to have the suspension sleeve 2 present without requiring the restriction of an enclosure tube 3, and the use of an enclosure tube 3 should not be considered limiting to the invention or even to the waveguide suspension. Overall, the waveguide 4 must be suspended in a manner that cushions it from shock and vibration stimuli so that associated erroneous responses are eliminated.

Suspension sleeve 2 includes an inner layer 27 and an outer layer 29. The fiber that makes up inner layer 27 of suspension sleeve 2 is non conducting and may be a fine, hard material, or a combination of materials such as ceramic or glass or metal or polymer. The strand count and weave configuration of such fiber are typically from eight to sixteen strands in diamond, regular, hercules or other weave pattern. Such strand, count and weave configuration enable the suspension sleeve 2 to act as a cushion between the waveguide 4 and the enclosure tube 3. Interior to the inner layer 27 and exterior to the waveguide 4, there is clearance 28 such that the inner layer 27 is loosely fitting around waveguide 4. The outer layer 29 of suspension sleeve 2 helps to maintain the shape of the inner layer 27, and isolate it from the enclosure tube 3. The outer layer 29 is typically a softer material, such as a silicone rubber and is a second layer of inner layer 27.

Suspension sleeve 2 ends at its remote side at end 31 facing toward the end plug 20. Juxtaposed with the end 31 of the suspension sleeve 2 is damping element 6. Damping element 6 is slipped over the end of the waveguide 4 and is coaxial with waveguide 4 and generally cylindrical in shape, as is suspension sleeve 2. However, the damping element 6 is not loose fitting over the waveguide 4, but is more constrictive over waveguide 4 in order to provide damping. Thus, as shown in FIGS. 2a and 2b, the inner layer 27 of damping element 6 snugly fits about waveguide 4. Further, the outer layer 29 of damping element 6 while usually of softer elastomer materials, such as silicone rubber, does not normally contact enclosure tube 3, as does outer layer 29 of suspension sleeve 2, but instead is sized to control the amount of and to exert pressure on the inner layer 27 which in turn exerts pressure on the waveguide 4. Thus, a space is left between the outer layer 29 of damping element 6 and the inner surface of enclosure tube 3.

In addition, a tuning wire 5 (see FIG. 2b) of a diameter ranging from 0.005 inches to 0.016 inches may be used to act as a wedge, thereby controlling the pressure of inner layer 27 on the waveguide 4. The tuning wire 5 is adjacent to waveguide 4 and extends substantially along and is enclosed by inner layer 27 of damping element 6. It is used to change the acoustic impedance of the damping element 6 but to do so gradually so that the sonic strain wave signal is dampened gradually along the distance of the waveguide 4 enclosed by damping element 6. In this way, no reflection will occur from sudden changes in impedance, but instead damping of the sonic strain wave amplitude along the damping element 6 will occur. It should be noted that the tuning wire 5 while only shown in FIG. 2b may be used with any of the configurations of FIGS. 2a–2d and may be used in any other kind of damping element for the purposes set out above.

Further, because damping element 6 is used to provide optimum damping of the sonic strain wave pulse traveling in the waveguide 4, and because proper acoustic matching of the waveguide 4 and the damping element 6 is determined by the pressure exerted on the waveguide 4 by the inner layer 27, there are other mechanisms besides the tuning wire 5 that can be used. As shown in FIGS. 2c and 2d, a damping element 6 for use over a broad temperature range could be used, comprising a short braided sleeve 8 of the sort of inner layer 27, but with such braided sleeve 8 inserted into a coaxial, larger diameter metal sleeve 9. This assembly of sleeves 8, 9 is slipped onto the end of the waveguide 4. The metal sleeve 9 may then be crimped such that the braided sleeve 8 contacts the waveguide 4 with sufficient pressure to provide the required damping action.

Thus, as seen through FIGS. 2a–2d, damping may occur through the pressure of outer layer 29 or through the tuning wire 5 trapped in inner layer 27 or through the crimping of metal sleeve 9 or by any other mechanism that applies the appropriate pressure to control the impedance matching along a predetermined length of the damping element 6 as determined by experiment.

The end 32 of damping element 6 facing end 31 of suspension sleeve 2 is preferably cut between a 40° and 50° angle and preferably about a 45° angle in order to properly match its impedance to that of the waveguide 4.

An additional way to minimize end reflections from the damping element 6 is to place another damping sleeve 33 of dissimilar material or size or pressure in front of damping element 6 (toward the suspension sleeve 2). Damping sleeve 33 should be designed to have a closer acoustic impedance match to the waveguide 4. That is, it should have less pressure, or smaller outer diameter, or lower mass density than damping element 6, or if it is an elastomer, it should have a low durometer, such that the front end reflection is minimized. Damping sleeve 33 includes a face 34 facing toward face 32 of damping element 6. Face 34 normally has a plane substantially perpendicular to the longitudinal axis of the waveguide 4. It should be noted that damping sleeve 33 may be used with any of the damping elements 6 of FIGS. 2a, 2b, 2c and 2d, and the depiction showing it only in FIG. 2a should not limit its generality. Further, the orientation of face 34 will not change if damping sleeve 33 is used with the damping sleeves 6 of FIGS. 2b, 2c or 2d, each of which has a slanted face 32. The face 34 will continue to have a plane substantially perpendicular to the longitudinal axis of the waveguide 4. Generally, this damping sleeve 33 does not damp as efficiently as the damping element 6, but it will damp the reflection from the damping element 6, thereby lowering the overall sonic energy leaving the damping system, damping element 6 acting as the primary damp and damping sleeve 33 acting as a secondary damp.

Still another method of minimizing the front end reflection coming from the damping element 6 is to expand the inside diameter of the damping element 6 at the front end. The end facing suspension sleeve 2. This can be accomplished by inserting a flaring tool in such front end of the damping element 6 just prior to placing it on the waveguide 4.

Still another method for minimizing the front end reflection coming from damping element 6 is to remove material from the outside diameter on such front end of damping element 6. This removal region should be in the range of 0.125" to 0.5" as measured from such front end of damping element 6. This can be accomplished, for example, by using a set of wire strippers to remove part of the elastomer that overlaps the braid.

The return wire 1 must pass over damping element 6 as shown in FIGS. 2a, 2b and 2d, or through damping element 6 as in FIG. 2c. In FIG. 2c, the return wire 1 is insulated (as it may be in all other cases) and can also act in a manner similar to the tuning wire 5 of FIG. 2b. In all events, the return wire 1 must then be attached to the tip of the waveguide 4 using solder or a crimp ring 7, and must be electrically connected to form the rest of the circuit to support the current pulse which begins in housing 17 and flows through waveguide 4 to return through return wire 1, which may be arranged as discussed in U.S. Pat. No. 3,898,555 or any other way known or to be known in the art.

The pressure applied by the inner layer 27 may be substantially uniform, but may also be nonuniform with less pressure on the side facing the housing 17 and more pressure on the side facing the end plug 20 to shorten the length of the damping element 6 for a given damping effectiveness while preventing reflection.

Alternately, the return wire 1 may be braided into suspension sleeve 2 or enclosure tube 3 may be conductive and the return wire 1 may be connected electrically to enclosure tube 3. Otherwise, in assembly, the return wire 1 and suspension sleeve 2 are inserted into enclosure tube 3. The waveguide 4 is then pulled into the suspension sleeve 2 because suspension sleeve 2 is sized such that the waveguide 4 is in loose contact with it but does not allow excessive lateral movement. Further, the damping element 6 is then slipped over the waveguide 4.

Figure 16:
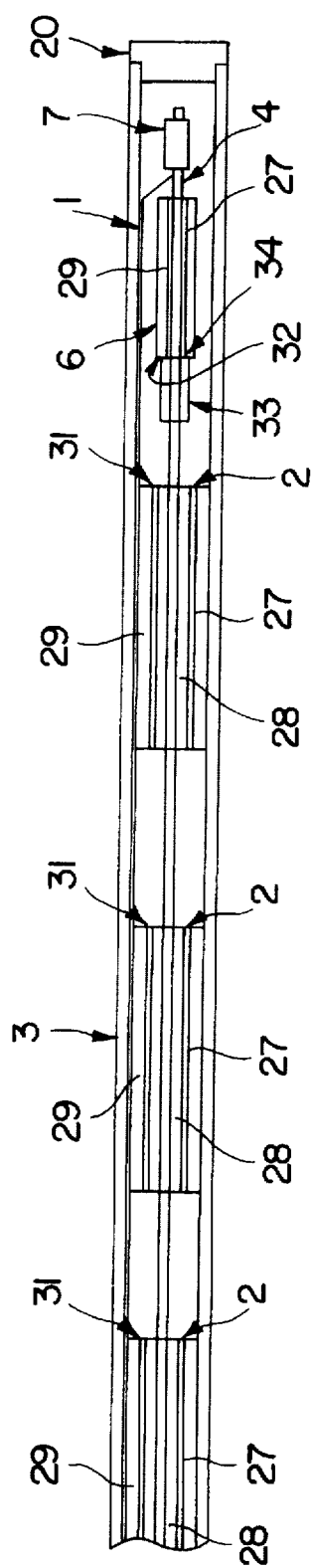
FIG. 16 illustrates a cross-sectional view of the sensing element assembly of an alternate embodiment of the present invention of FIG. 1 taken along section lines 2—2 of FIG. 1 showing a portion of the waveguide and surrounding partial sleeves and showing the damping element at the end of the waveguide.

Further, a series of short suspension sleeves 2 may be located along the length of waveguide 4, instead of a single continuous suspension sleeve 2, as shown in FIG. 16, although this is an alternate embodiment and believed to be more difficult to construct. In such a series, care should be taken in the spacing to decouple or otherwise suppress external or internal mechanical noise.

Return wire 1, suspension sleeve 2, enclosure tube 3 and waveguide 4 are supported in housing 17 by a bracket 10 (FIG. 4) preferably made of plastic. The details of the bracket 10 are shown in FIGS. 5–12. Bracket 10 includes a base 60, the outer diameter of base 60 being substantially equal to the inner diameter of the main enclosure 62 of housing 17. Base 60 includes two flanges 64, 66 located on either side of a recess portion 68 of base 60. This arrangement permits a groove 70 (FIG. 4) to be present between the two flanges 64, 66. A seal ring 16 is located inside groove 70 sealingly engaging the sidewalls 72, 74 of flanges 64, 66, respectively, and the outward facing wall 76 of recess 68, as shown in FIG. 4. As used above, the word "diameter" does not imply a circular shape. As best seen in FIG. 4 and from the shape of flanges 64, 66, the interior 62 of housing 17 is more rectangular in shape with two curved opposing sides. Thus, with the shape and sizing of flanges 64, 66, seal ting 16 also contacts the interior sidewall surface 78 of the main enclosure 62 of housing 17. Therefore, seal ring 16 acts to seal wiring and connectors interior in housing 17 to surface 80 of flange 66 (FIG. 4 and FIG. 9).

The end of housing 17 is closed by flange 19. An opening 82 is formed in flange 19 and sized to permit enclosure tube 3 to snugly fit through opening 82 and extend into an opening 84 formed in flanges 64, 66 and recess portion 68 of base 60 which is coaxial with opening 82 and of the same size as opening 82. Base 60 also includes a second opening 86 formed adjacent to flange 66 and coaxial with opening 84 but of smaller diameter than opening 84, thereby forming a shoulder 88 between openings 84, 86 against which abuts end 90 of the combination of suspension sleeve 2 and enclosure tube 3.

Bracket 10 further includes an extension 91 that extends beyond base 60 toward the end surface 92 of enclosure or housing 17. Extension 91 includes an intermediate opening 94 spaced between opening 86 and the end surface 96 of bracket 10 and end 98 of bracket 10. Opening 94 is coaxial with openings 84, 86. Opening 94 is also partially formed by bracket cover 14 (FIG. 8). In forming such opening 94, a lateral opening 100 is formed by the clearance between bracket 10 and a notch 61 in bracket cover 14. Opening 100 connects the interior between opening 94 and opening 86 with a channel 30, formed in bracket cover 14.

With the combination of suspension sleeve 2 and enclosure tube 3 abutting or otherwise terminating at shoulder 88, both the return wire 1 and the waveguide 4 extend from end 90 into the space interior to housing 17. Return wire 1 is caused to pass through opening 100 and into channel 30 with a specific alignment described below. Waveguide 4 continues coaxial with opening 94 and is anchored by a waveguide anchor 11, preferably made of brass. Waveguide anchor 11 has a cylindrical shaped lower end 101 of diameter sufficient to fit into opening 94. A larger substantially rectangular cap 103 forms the top of waveguide anchor 11 with shoulder 105 formed therebetween. Shoulder 105 rests on surfaces 102, 104 which form the upper or inner facing surface of opening 94. Another opening 55 is provided in extension 91 whose axis is at right angles to the axis of openings 84, 86, 94 (FIG. 10). The identical opening 55 is formed in the other side of the extension 91 as shown in FIG. 7. The waveguide anchor 11 is sized such that in its seated position with surface 105 in contact with surfaces 102, 104, anchor 11 does not extend over opening 55. Waveguide anchor 11 further includes a central opening 106 coaxial with the axis of suspension sleeve 2 and waveguide 4. Opening 106 is sized to permit the insertion of waveguide 4 through it.

Cylindrical shaped elements 108, 110 extend from surface 98 and face toward the end 92 of housing 17. The upper surface 114 of cylindrical member 110 is substantially coplaner with the end surfaces 96 and act as supports for a printed circuit board 12 mounted near end 92. Cylindrical shaped elements 108 extend from surfaces 96 and engage reciprocally located features (not shown) in circuit board 12 to locate and align circuit board 12. Printed circuit board 12 is equipped with a series of openings 116, 118 and two not shown to permit return wire 1 to pass through opening 116 and waveguide 4 to pass through opening 118 and two additional leads from a pickup coil 13 yet to be discussed through the local buffer circuit yet to be discussed. In addition, printed circuit board 12 has openings 120 that permit leads 50 to pass from connector 21 through printed circuit board 12. Thus, return wire 1, waveguide 4, a dummy lead 50 and leads 35 of pickup coil 13 (yet to be discussed) through the local buffer circuit yet to be discussed all pass through printed circuit board 12 and are electrically connected by printed circuit board 12 with electrical connector 21 as five leads 50 (FIG. 3). Connector 21 physically rests on printed circuit board 12 and extends from it through an opening 122 formed in the end 92 of housing 17 to make connector 21 available to customers or users as shown in FIG. 3. Housing 17 is closed by flange 19 which may also include extensions 124 having openings 126 therethrough for mounting housing 17 in the customer's or user's device.

As shown in FIG. 7, two additional openings 128, 130 are included in extension 91 of bracket 10. The axis of each opening 128, 130 is perpendicular to the axis of the other openings discussed above. Opening 128 is larger than opening 130 and is sized to admit a pickup coil 13 (FIGS. 4). Pickup coil 13 may be any type coil and is shown preferably with a high wire winding count, such as 400 to 2500 turns, and preferably 1800 turns, instead of the low winding count of the prior art. The pickup coil 13 is shown in FIG. 4 as having copper windings 40 mounted on a bobbin base 45. Two leads 35 extend from pickup coil 13 through printed circuit board 12 on which is located the local buffer circuit where they are electrically connected as discussed above. Pickup coil 13 is mounted coaxially about a tape 15 reciprocally mounted in an opening 132 in pickup coil 13. Tape 15 extends from substantially the end of bobbin 45 facing outward towards housing 17 through the pickup coil 13 and to the waveguide 4 where it is connected to waveguide 4 by welding or other method of mechanical connection. Tape 15 does extend for a length 15' beyond the end of the bobbin 45 a specified length. This length 15' provides constructive interference to the signal. The signal is developed as a voltage across the coil 13. The constructive interference is produced by the sonic wave continuing past the coil 13, reflecting from the end of tape 15, including all of the length 15', and arriving back at coil 13 with such time delay as to produce an additive effect. This causes constructive interference for any type of tape 15 or circuitry with respect to coil 13. An anchor or bracket for the end of tape 15 could alternately be used to set the length 15'. Tape 15 is typically made of a ferromagnetic or magnetostrictive material and may be of the same material as the waveguide 4 but have a different metallurgical treatment. Opening 128 is thus located in close proximity to channel 30 to place the pickup coil 13 in close proximity to return wire 1, thereby permitting a reduction in energy of the input pulse to waveguide 4.

As shown in FIG. 14, a local buffer circuit or amplifier comprising a local buffer amplifier 24 and clipper 22, 23 is connected to pickup coil 13. The purpose of the buffer amplifier 24 is to isolate the pickup coil 13 from electrical, external interference and to provide a low output impedance drive for connecting to remotely located electronics 26 and may also be used to amplify the signal, although this is not preferred. The local buffer circuit is mounted close to pickup coil 13 to lower capacitance. The local buffer circuit may incorporate some sort of signal limiting device or devices such as diodes 22, 23 or transistor 36 in combination with amplifier 24 of FIG. 15 to limit the amplifier 24 signals to nominal levels, particularly during a waveguide interrogation pulse.

The local buffer circuit or amplifier of FIGS. 14 or 15 is incorporated directly after the pickup coil 13 and would be included in the housing or shield 17. The circuit that drives the waveguide 4 would be outside housing or shield 17. For FIG. 14, two diodes 22, 23 are connected in opposite directions parallel to pickup coil 13. One side of pickup coil 13 and one side of each of the diodes is then connected to the base of an emitter amplifier 24, the collector portion of which is connected to the other end of pickup coil 13 and the diodes 22, 23. Signals from the pickup coil 13 are fed into emitter amplifier 24 which reduces the electrical impedance of the pickup coil 13 by several orders of magnitude. The emitter of emitter amplifier 24 is the output in both embodiments, and, in use, the receiving circuit on a board 157 (FIG. 13) will use a pull-up resistor (not shown), as discussed in more detail below. The local buffer circuit is included because of the high number of turns of winding of the pickup coil 13. In the prior art, there are only a few turns in order to avoid noise and therefore only a few millivolts of output signal was developed. With a large number of turns, such as 400 to 2500 turns and preferably 1800 turns for pickup coil 13 as discussed above, one can obtain a signal in the hundreds of millivolt range. However, pickup coil 13 with a large number of turns has high impedance and potential noise that may be introduced between the pickup coil 13 and the electronics 26 where the output signal is directed which is usually on another board 157, (FIG. 13) as discussed in more detail below, which may be two inches or more away from the physical location of pickup coil 13. The local buffer circuit lowers the high impedance and therefore the noise that can be picked up by the leads 35, 156 between the pickup coil 13 and the electronics on board 157 (FIG. 13) that processes the signal from leads 35 via a cable 156 discussed in more detail below. Further, the metal housing 17 in which both the pickup coil 13 and the local buffer circuit are located enhances the use of the new high impedance by blocking electrical noise, thereby producing a high signal level using low impedance external to the transducer.

The diodes 22, 23 act to clip or limit the peak of the signal, and hence the energy produced, in the pickup coil 13 which is generated by the signal received through the magnetostrictive device. This helps the recovery of the pickup coil 13 for the next input by limiting the mount of energy delivered from the pickup coil 13. Thus, the position magnet may more closely approach the head of the transducer 25.

The local buffer circuit of FIG. 15 is an alternate embodiment that uses two PNP transistors, one as an emitter follower buffer amplifier 24 and the other as reverse clipper diode 36. Thus, instead of diodes 22, 23, to perform the peak clipping of the signal, the collector of transistor 36 is connected to the base of emitter amplifier 24 and the base of transistor 36 is connected to the collector of emitter amplifier 24. The emitter of transistor 36 is not connected to anything. The base to collector of transistor 36 is used as a diode which matches the base to collector junction of emitter amplifier 24 which acts as the reverse diode.

The single transistor circuit with a limiting diode or transistor is the preferred method to provide minimum cost and size. Other embodiments are possible, and may utilize a multiple transistor circuit to provide amplification, impedance matching, amplitude control, or voltage regulation. Such circuits may also, or alternatively, include operational amplifiers and other integrated circuits to provide the improved performance, but at added cost.

The use of a local buffer circuit with housing or shield 17 reduces the sensitivity to electronic noise, maintains the signal integrity and enables the signal to be transmitted over long distance. The reduction of saturation because of the diodes 22, 23 or transistors 24, 36 allows the return signals to be nearer to the mode converter and to have a very short response time after interrogation.

Opening 130 is sized to receive a bias magnet 18 or unmagnetized magnet material which could be installed for later magnetization during the assembly process.

For assembly of the waveguide assembly into housing 17, the waveguide 4 is placed into the waveguide anchor 11 after suspension sleeve 2, waveguide 4 and enclosure tube 3 had been inserted into the openings 82, 84 of flange 19 and bracket 10. After the waveguide 4 is inserted into anchor 11, it is connected to the printed circuit board 12. The suspension sleeve 2 and enclosure tube 3 are held in place in the bracket 10 with adhesive or by suitable retaining elements not shown.

After the waveguide 4 is placed into the brass waveguide anchor 11 and connected to the printed circuit board 12, the pickup coil 13 is added. The return wire 1 is held in place while the bracket cover 14 is installed and then the tape 15 is welded or otherwise mechanically connected onto the waveguide 4 using openings 55. It is not necessary to attach the tape in the sequence set out above, and the sequence should not be considered as limiting for all the inventions disclosed. The bias magnet 18 is then installed, or as indicated above unmagnetized magnetic material could have been installed earlier and then magnetized. Finally seal ring 16 is placed into groove 70 of bracket 10. Thereafter, the bracket 10 and the waveguide 4 and the flange 19 (if the flange 19 is used) as an assembly is inserted into the housing 17. The housing 17 is crimped and/or welded in place. Finally, the air inside the device is displaced by a dry, unreactive gas, and the end plug 20 is held in place with adhesive or other means.

The distance and location of return wire 1 with respect to waveguide 4 can be adjusted in any appropriate manner to permit the magnetic fields induced in these two wires to cancel each other. In addition, by properly routing return wire 1 in the area immediately adjacent the pick up coil 13, the ringing of the interrogation pulse can be reduced significantly, such as fifty percent or more. The size and magnetic properties, such as using copper of the sizes set out above for tuning wire 5 also have an effect on the ringing. Transducer 25 is produced in one inch incremental lengths or some other incremental length on the order of one-half inch to four inches. This is done to reduce the total number of unique lengths to which waveguide 4, suspension sleeve 2, return wire 1, and enclosure tube 3 must be cut. This reduces the cost and complexity of manufacturing transducer 25, yielding a more cost effective product. Complete sensor assemblies which utilize transducer 25 can be manufactured in any length or incremental length desired. This is accomplished by providing a mounting means for transducer 25 within the complete sensor assembly which allows transducer 25 to be positioned axially at any point within ±½ inch of its median position within the complete sensor assembly. A transducer 25, the length of which is within ±½ inch of the length desired for the complete sensor assembly, can thus be positioned within the complete sensor assembly to provide precisely the sensing length desired.

Figure 13:
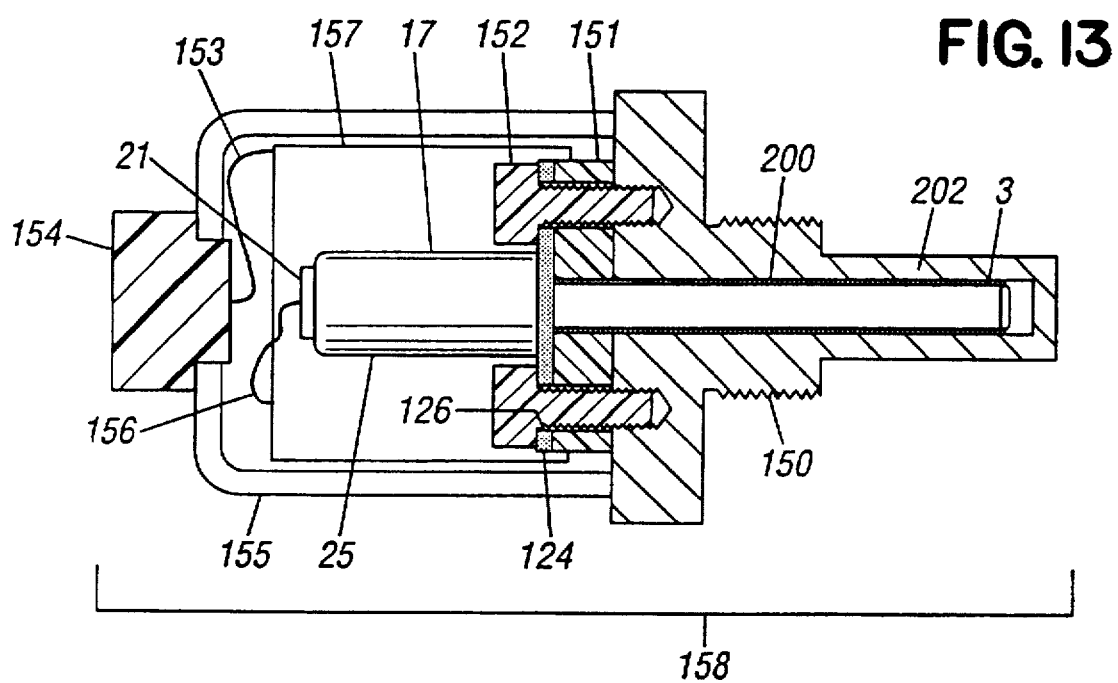
FIG. 13 illustrates a cross sectional view of a sensor assembly using the transducer of the preferred embodiment of the present invention.

FIG. 13 illustrates one possible implementation of the mounting means for using transducer 25 in one inch incremental lengths or some other incremental length on the order of one-half inch to four inches to produce sensor assemblies 158 in any length desired. Sensor assembly 158 includes an application housing 150 having an endcap 155. Transducer 25 is secured to application housing 150 using screw fasteners 152 passing through openings 126 of extensions 124 of mounting housing 17 or other suitable attachment means. When necessary to achieve a proper fit, a spacer block 151 may be positioned between transducer 25 and application housing 150. Spacer block 151 is utilized in a variety of thicknesses or is not used at all depending on the sensing length required of sensor assembly 158 and the standard length of the enclosure tube 3 containing waveguide 4 supplied as part of the transducer 25. Fasteners 152 are also used in a variety of lengths to correspond to the thickness of spacer block 151. Transducer 25 is shown in FIG. 13 in the middle of the range of movement possible within endcap 155. Wire harness 156 carries signals and supply voltages between transducer 25 and customer or vendor supplied electronic circuit board 157. Wire harness 156 is of sufficient length and flexibility to allow transducer 25 to be secured anywhere within the allowed range of positions after being connected to electrical connector 21. Electronic circuit board 157 provides the interrogation and signal conditioning circuitry, as known in the art, necessary to communicate with the end user system and to provide the desired position feedback signals. A wire harness 153 is connected to the electronic circuit board 157 and carries signals and supply voltages between electronic circuit board 157 and an external connector 154 attached to endcap 155. External connector 154 provides the physical means for connecting to the end user system (not shown).

Further, the transducer disclosed in this application may be fully electrically isolated from all devices in which it is mounted by having mounting or spacer block 151 and screw fasteners 152 made of nonconducting material and having an insulating material 200 between tube 3 and external extension tube 202.

All of the features of a particular preferred embodiment of the waveguide assembly are not shown in the above disclosure in order to emphasize the generality of the disclosure.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed as invention is:

1. A converter for processing a sonic wave of a magnetostrictive transducer having an exterior surface to an electrical output signal for use by an electronic circuit, the electronic circuit being located outside the exterior surface, the output signal generated by a higher magnitude input pulse, comprising:

means for converting the sonic wave into the electrical output signal, including a pickup coil having at least two leads, said means for converting being located inside the exterior surface;

first means located inside the exterior surface and connected to said leads having solely passive components for modifying the electrical output signal from said coil to avoid saturation of the electronic circuit by ringing caused by the input pulse.

2. The converter of claim 1, wherein said first means clips the peak of the signal.

3. The converter of claim 2, wherein said first means includes:

a first diode connected electrically in parallel to said leads of said pickup coil; and a second diode oriented oppositely to said first diode and connected electrically in parallel with said first diode; said first and second diodes sized to clip the signal.

4. The converter of claim 3, wherein there is further included an amplifier having a base and a collector, said base and said collector connected to said two leads of said pickup coil, said amplifier sized to reduce the electrical impedance of said pickup coil and produce the signal.

5. The converter of claim 2, wherein said first means includes:

a first transistor having a collector, said collector connected to one of said leads of said pickup coil and a base, said base connected to the other of said leads of said pickup coil.

6. The converter of claim 5, wherein said first means further includes a second transistor having a base, collector and emitter, said base of said second transistor connected to said collector of said first transistor and said collector of said second transistor connected to said base of said first transistor.

7. The converter of claim 6, wherein said emitter and collector of said second transistor produce the signal.

8. The converter of claim 2, wherein there is further included an amplifier having a base and a collector, said base and said collector connected to said two leads of said pickup coil, said amplifier sized to reduce the electrical impedance of said pickup coil and produce the signal.

9. The converter of claim 8, wherein the exterior surface is part of an enclosure, said enclosure enclosing said pickup coil and said amplifier and having shield means for shielding said pickup coil and said amplifier from the circuit.

10. The converter of claim 1, wherein the exterior surface is part of an enclosure, said enclosure enclosing said pickup coil and said first means and having shield means for shielding said pickup coil and said first means.

11. The converter of claim 1, wherein said windings of said pickup coil are in a range of 400 to 2500 turns.

12. A converter for processing the initial output signal generated by a sonic wave of a magnetostrictive transducer having an outer coveting to produce a modified electrical output signal, comprising:

a pickup coil located within the outer covering and generating the initial electrical output signal from the sonic wave, said pickup coil having at least two leads; and first means located within the outer covering and connected to said leads of said pickup coil and responsive to the initial electrical output signal for lowering the impedance of said pickup coil, said first means producing the modified electrical output signal.

13. The converter of claim 12, wherein said first means includes an amplifier.

14. The converter of claim 13, wherein said amplifier includes a first transistor having a base and a collector and an emitter, said base and said collector connected to said two leads of said pickup coil, said first transistor sized to reduce the electrical impedance of said pickup coil.

15. The converter of claim 13, wherein said amplifier further includes a second transistor having a base and a collector, said base of said second transistor connected to said collector of said first transistor and said collector of said second transistor connected to said base of said first transistor.

16. The converter of claim 15, wherein said emitter and collector of said first transistor produce the signal.

17. The converter of claim 14, wherein said emitter and collector of said first transistor produce the signal.

18. The converter of claim 13, wherein there is included second means for clipping the peak of the signal.

19. The converter circuit of claim 18, wherein said second means includes:

a first diode electrically connected in parallel to the leads of said pickup coil;

a second diode oriented oppositely to said first diode and electrically connected in parallel with said first diode; and said first and second diodes sized to clip the signal.

20. The converter of claim 18, wherein said second means includes:

a first transistor having a collector, said collector connected to one of said leads of said pickup coil and a base, said base connected to another of said leads of said pickup coil.

21. The converter of claim 20, wherein said second means further includes a second transistor having a base, collector and emitter, said base of said second transistor connected to said collector of said first transistor and said collector of said second transistor connected to said base of said first transistor.

22. The converter of claim 12, wherein there is included second means for clipping the peak of the signal.

23. The converter of claim 12, wherein said first means includes:

a first transistor having a collector, said collector connected to one of said leads of said pickup coil and a base, said base connected to another of said leads of said pickup coil.

24. The converter of claim 23, wherein said first means further includes a second transistor having a base, collector and emitter, said base of said second transistor connected to said collector of said first transistor and said collector of said second transistor connected to said base of said first transistor.

25. The converter of claim 24, wherein said emitter and collector of said second transistor produce the signal.

26. The converter of claim 12, wherein the outer covering is part of an enclosure, said enclosure enclosing said pickup coil and said first means and having shield means for shielding said pickup coil and said first means.

27. The converter of claim 12, wherein the outer covering is part of an enclosure, said enclosure enclosing said pickup coil and having shield means for shielding said pickup coil.

28. The converter of claim 12, wherein said windings of said pickup coil are in a range of 400 to 2500 turns.

29. A converter for processing a sonic wave of a magnetostrictive transducer to produce an electrical output signal, the magnetostrictive transducer surrounded by an electrical environment, comprising:

a shield means for shielding electronic noise;

a pickup coil within said shield means having a number of windings in the range of 400 to 2500 turns to generate the electrical output signal; and a buffer circuit mounted in close proximity to said pickup coil within said shield means, said buffer circuit minimizing parasitic reactance between said coil and the electrical environment to avoid adverse noise effect on the electrical output signal.

30. The converter of claim 29, wherein said shield means includes a housing, said housing containing said pickup coil and said buffer circuit.

\* \* \* \* \*